United States Patent
Lee

(10) Patent No.: US 7,035,662 B2
(45) Date of Patent: Apr. 25, 2006

(54) METHOD AND APPARATUS FOR MANAGING POWER IN A MOBILE COMMUNICATION SYSTEM

(75) Inventor: Jung Yun Lee, Daejeon-si (KR)

(73) Assignee: LG Electronics Inc., Seoul (KR)

( * ) Notice: Subject to any disclaimer, the term of this patent is extended or adjusted under 35 U.S.C. 154(b) by 459 days.

(21) Appl. No.: 10/329,542

(22) Filed: Dec. 27, 2002

(65) Prior Publication Data

US 2003/0125069 A1 Jul. 3, 2003

(30) Foreign Application Priority Data

Dec. 28, 2001 (KR) ...................... 10-2001-0087285

(51) Int. Cl.
*H04B 7/00* (2006.01)
*H04Q 7/20* (2006.01)

(52) U.S. Cl. ........................ 455/522; 455/69; 370/335; 370/342

(58) Field of Classification Search ................ 455/522, 455/69, 41.2, 446, 458; 370/335, 342
See application file for complete search history.

(56) References Cited

U.S. PATENT DOCUMENTS 6,490,460 B1 * 12/2002 Soliman ...................... 455/522
6,628,957 B1 * 9/2003 Weaver et al. ............... 455/522
6,628,958 B1 * 9/2003 Kamel et al. ................ 455/522
6,708,041 B1 * 3/2004 Butovitsch et al. .......... 455/522
6,823,193 B1 * 11/2004 Persson et al. .............. 455/522
6,856,812 B1 * 2/2005 Budka et al. ................ 455/522
2003/0022630 A1 * 1/2003 Gandhi et al. ................ 455/69

* cited by examiner

*Primary Examiner*—Curtis Kuntz
*Assistant Examiner*—Tuan H. Nguyen
(74) *Attorney, Agent, or Firm*—Fleshner & Kim, LLP

(57) ABSTRACT

A method and apparatus can manage power in a mobile communication system according to a call setup in a user equipment. The method can include setting a radio link in response to a setup command, receiving a radio access bearer allocation request command to reset a down link power range, and performing a radio link reconfiguration with the base station; transmitting a down link power measurement request command to adjust the down link power range in response to a down link power measurement result; reconfiguring a radio link in response to the adjusted down link power range. The transmitting and reconfiguring can be repeatedly performed for user equipment. Accordingly, an excessive down link power allocation to a specific subscriber and an abrupt variation of a total down link power can be reduced, and a number of subscribers, who respective cells can accommodate by a call starting control, can be increased.

25 Claims, 5 Drawing Sheets

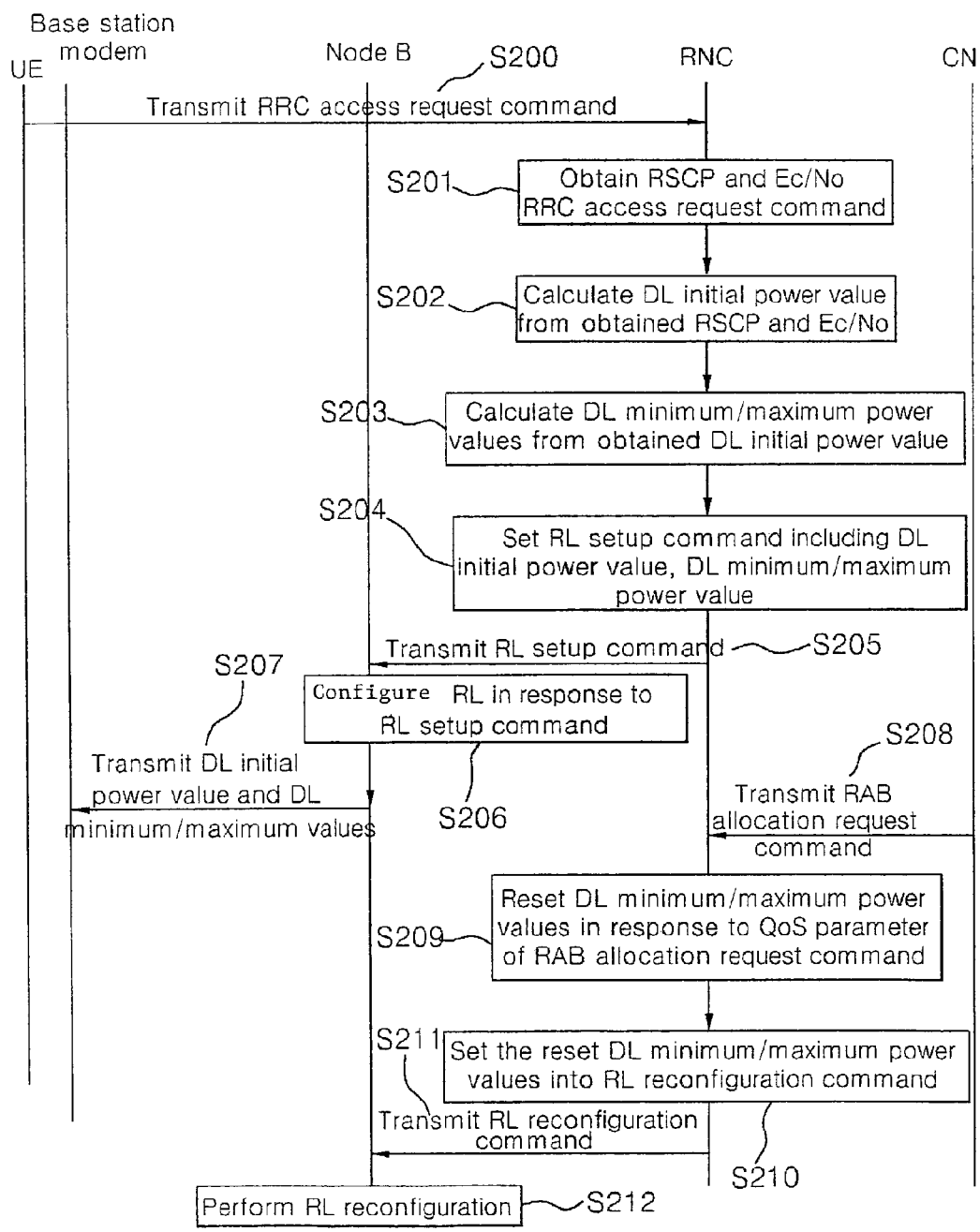

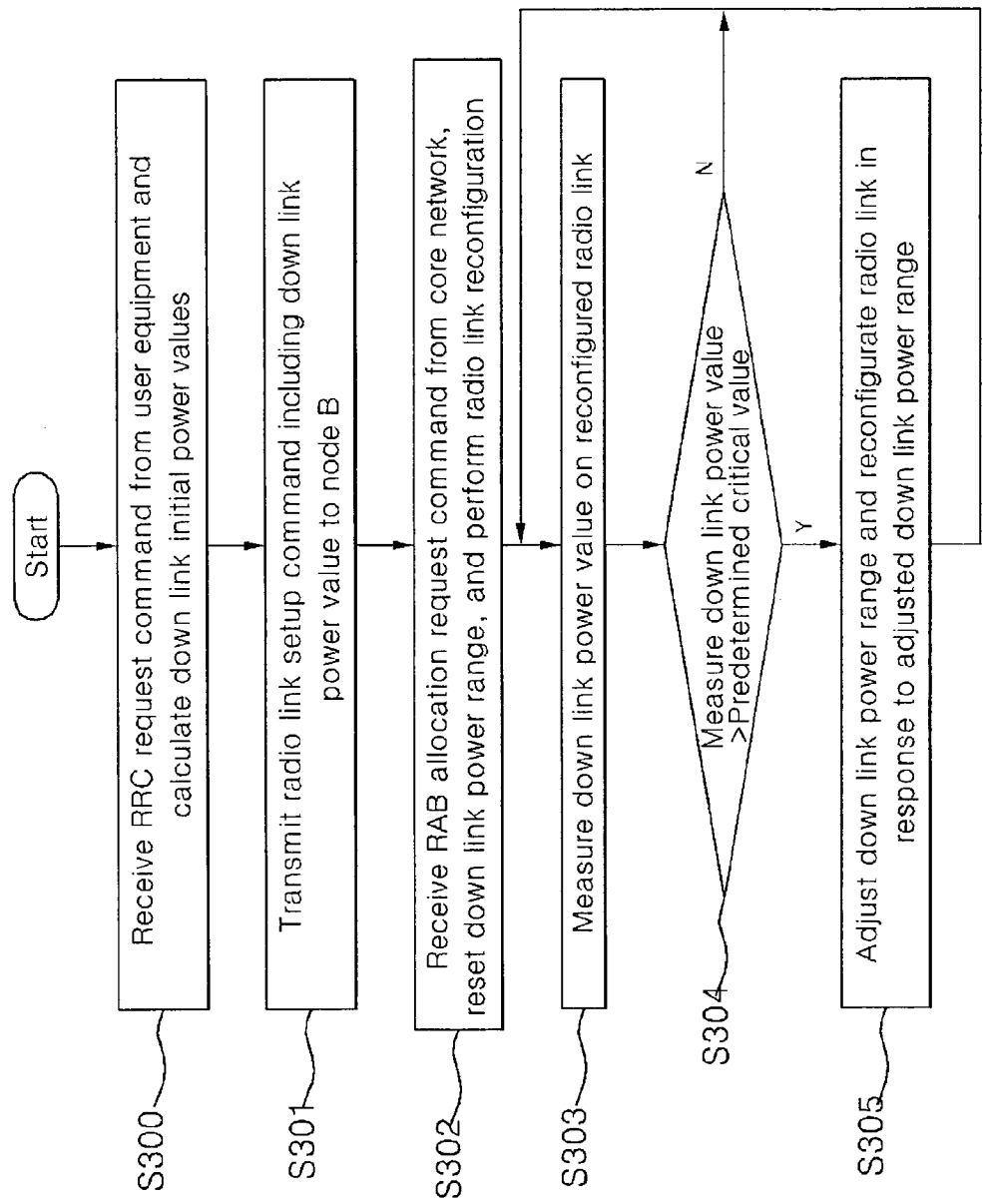

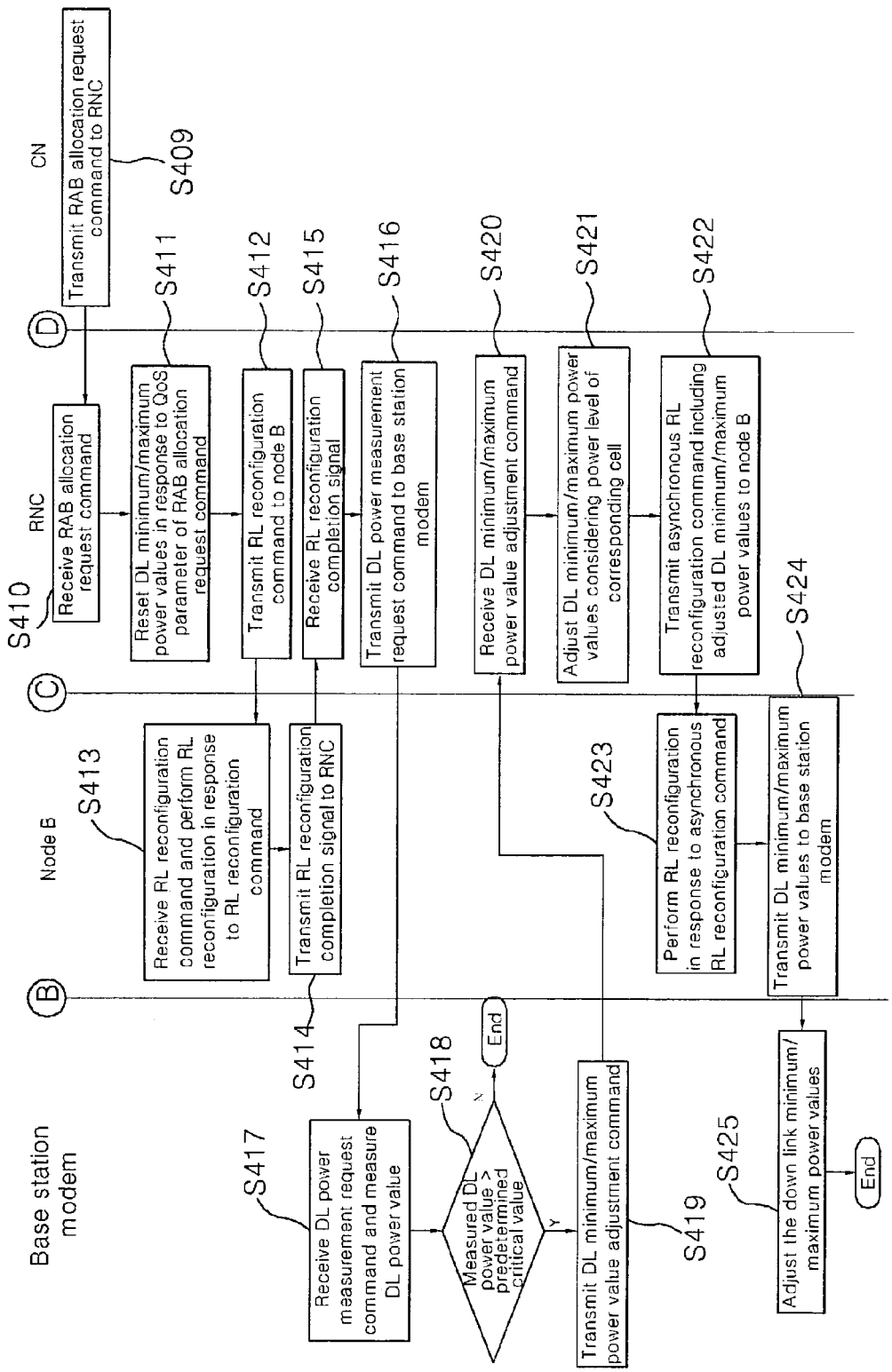

METHOD AND APPARATUS FOR MANAGING POWER IN A MOBILE COMMUNICATION SYSTEM

BACKGROUND OF THE INVENTION

1. Field of the Invention

The present invention relates to a method and apparatus for managing power in a mobile communication system.

2. Background of the Prior Art

Generally, a cellular phone can be characterized as a mobile station, a mobile terminal, or a user device. A mobile terminal communicates with one or more base stations through an aerial interface. A base station is managed by a base station controller. In some systems, the base station controller functions as a radio network controller, and is hereinafter referred to as an RNC.

A radio network controller is typically a connection-oriented type, such as a PSTN (Public Switched Telephone Network) or an ISDN (Integrated Services Digital Network), and is connected to one or more communications networks through one or more control nodes. Control nodes can include a mobile switch center node for accessing a circuit-switched network, and a general packet radio service node for accessing to a packet-switched network.

An exemplary asynchronous mobile communication system is described with reference to FIG. 1. Referring to FIG. 1, an asynchronous mobile communication system includes a user equipment (UE) 100, an RNC 110, a node B 120, a base station modem 130, and a core network (CN) 140. The RNC 110 controls radio resources in the cell it is part of, and also functions to control a corresponding cell.

In addition, the RNC 110 sets minimum power value, maximum power value or the like of a corresponding call when an initial call is set in a mobile communication system. The RNC 110 transmits to the node B 120 a radio link setup command along with the set minimum/maximum power value contained in the setup command.

The node B 120 is a logic node that is responsible for radio transmission/receipt to or from the user equipment 100 that is located in one or more cells. The node B 120 constitutes a radio link in response to a radio link setup command transmitted from the RNC 110, and transmits to the base station modem 130, initial power value, minimum power value and maximum power value, with all of these values contained in the radio link setup command.

The base station modem 130 changes the down link power value between the minimum power value and the maximum power value transmitted from the node B 120 by the inner loop power control.

FIG. 2 is a flow diagram showing a power managing method in a related art mobile communication system. Referring to FIG. 2, user equipment (UE) transmits a radio resource control (RRC) access request command to the RNC so as to set a signal path. (S200) Here, the RRC access request command includes an identification number of the user equipment, a request service category requested by the user, and a measurement on random access channel (RACH) information element (MORIE).

The RNC receives an RSCP (Received signal code power) value or an Ec/No (i.e., RSCP/RSSI (Received signal strength indicator)) value from the MORIE contained in the RRC access request command. (S201). The RRC indicates the protocol layer managing the radio resource. The MORIE is an information element contained in the RRC access request command transmitted from the user equipment to the RNC. The MORIE may include information, such as Ec/No or RSCP, measured on the RACH by the user equipment. After the step of 201, the RNC obtains the down link initial power value from the RSCP or Ec/No value through the open loop power control. (S202)

After step S202, the RNC obtains the down link minimum power value and the down link maximum power value from the obtained down link initial power value. (S203)

After the step of S203, the RNC sets a radio link setup command including the obtained down link initial power value, the down link maximum power value, and the down link minimum power value. (S204). Other data may also be included in radio link setup command.

After the step of S204, the RNC transmits the set radio link setup command to the node B. (S205)

In step S205, the node B constitutes a radio link in response to the radio link setup command transmitted from the RNC, and then transmits to the base station modem down link initial power value, down link minimum power value and maximum power value, all of which are contained in the radio link setup command. (S206, S207). In step S207, a signal path of the user equipment is set. After this step, a traffic path of the user equipment is set.

Hereinafter, a method for setting the traffic path will be described. A core network transmits a RAB (Radio Access Bearer) allocation request command to the RNC, so as to set the traffic path. (S208). After the traffic path is set, the RNC resets the down link maximum power value and the down link minimum power value in response to QoS (Quality of Service) parameter of the RAB allocation request command. (S209) In other words, the RNC sets differently the down link maximum power value and the down link minimum power value according to a service quality level.

After the step of S209, the RNC inserts the reset down link maximum power value and the reset down link minimum power value into a radio link reconfiguration command, and then transmits the radio link reconfiguration command to the node B. (S210, S211). However, since the minimum power value and the maximum power value are not changed, there is no appropriate preparation for an instantaneous increase of power caused by an abrupt movement of a mobile terminal moving towards shadow areas within a communication sector. An additional problem is that the RNC must set sufficient minimum and maximum power ranges, when the minimum power value and the maximum power value are set.

Further, the down link initial power value and its range are fixed. In this case, since the terminal abruptly moves to shadow areas, the power magnitude required is instantaneously increased and instantaneous power of the base station modem is also rapidly increased, due to inner loop power control. This causes a problem of attenuating power occupiable or useable by other subscribers. Also, with an abrupt increase of down link power, up link power is also increased, thereby increasing interference, so that other subscriber's speech quality is degraded.

Furthermore, in third generation systems, instantaneous increase of power affects call admission control (CAC), so that the probability of admitting other subscribers is reduced.

SUMMARY OF THE INVENTION

An object of the present invention is to provide a method and apparatus for managing power in a mobile communication system that substantially obviates one or more problems due to limitations and disadvantages of the related art.

Another object of the present invention is to provide a method and apparatus for managing power in a mobile communication system, capable of increasing or maximizing the number of subscribers within one cell by effectively controlling minimum/maximum power range on a down link of a node belong to an RNC of the mobile communication system.

Another object of the present invention is to provide a method and apparatus for managing power in a mobile communication system, capable of preventing an excessive down link power allocation to a specific subscriber, preventing an abrupt variation of a total down link power, and increasing or maximizing the number of subscribers, which respective cells can accommodate, by a call starting control, through an effective allocation of resources.

To achieve at least these and other advantages in whole or in part and in accordance with the purpose of the present invention, as embodied and broadly described herein, there is provided a method for managing power in a mobile communication system according to a call setup in a user equipment, the method including a) receiving a radio resource control access request command from the user equipment and calculating a down link initial power value and a down link power range, b) transmitting a radio link setup command including the down link power value to a base station, c) setting a radio link in response to the radio link setup command, receiving a radio access bearer allocation request command to reset the down link power range, and performing a radio link reconfiguration with the base station, d) transmitting a down link power measurement request command to adjust the down link power range in response to a down link power measurement result of a base station modem, e) reconfiguring a radio link in response to the adjusted down link power range, and f) performing the d), e) steps repeatedly for the user equipment at a calling state.

To further achieve at least these and other advantages in whole or in part and in accordance with the purpose of the present invention, as embodied and broadly described herein, there is provided a method for managing power in a mobile communication system, the method including a) receiving a radio resource control access request command from a user equipment by a base station, obtaining a received signal code power or a signal to noise ratio from MORIE contained in the received radio resource control access request command to calculate a down link initial power value and down link minimum/maximum power values, b) transmitting a radio link setup command including the down link initial power value and the down link minimum/maximum power values to a node B, c) receiving a radio access bearer allocation request command from the core network by the base station, resetting the down link minimum/maximum power values in response to QoS (Quality of Service) parameter of the radio access bearer allocation request command, and performing the radio link reconfiguration, d) transmitting a down link power measurement request command from a RNC to a base station modem via the node B, e) continuously measuring the down link power value in the base station modem and, if the down link power value is larger than a critical value of a down link measurement request, transmitting down link minimum/maximum power adjustment command to the RNC via the base station, f) adjusting the down link minimum/maximum power values in consideration for a power level of a cell by the base station, and determining whether or not an available down link power exists in corresponding cell, g) if the available down link power exists in the corresponding cell, adjusting the down link minimum/maximum power using an asynchronous radio link reconfiguration, and transmitting the adjusted down link minimum/maximum power values to the base station modem via the node B to thereby adjust the down link minimum/maximum power values, and h) performing the d), e), f), g) steps repeatedly for the user equipment at a calling state.

To further achieve at least these and other advantages in whole or in part and in accordance with the purpose of the present invention, as embodied and broadly described herein, there is provided a method for managing power in a mobile communication system according to a traffic path setup after a call setup of a user equipment, the method including if a radio access bearer allocation request command is received from a core network, resetting minimum/maximum power values in response to the radio access bearer allocation request command, measuring the reset minimum/maximum power values and determining whether the measured power value is larger than a predetermined critical value, if the measured power value is larger than the critical value, adjusting the minimum/maximum power values in consideration for a power level of corresponding cell, and determining whether an available power exists in the cell, and if the available power exists in the cell, transmitting an asynchronous radio link reconfiguration command including the there is provided a method including a) receiving a signal to initialize a power value and establish a power range related to said received signal, b) transmitting a setup signal including said power value to a communication node, c) setting a communication link in response to said setup signal, receiving an allocation signal to reset said power range, and performing a communication link reconfiguration with said communication node, d) transmitting a power measurement signal to adjust said power range in response to a power measurement result of a communication node device, e) reconfiguring a communication link in response to the adjusted said power range, and f) performing the d) and e) steps repeatedly for the user equipment at a communication state.

It is to be understood that both the foregoing general description and the following detailed description of the present invention are exemplary and explanatory and are intended to provide further explanation of the present invention as claimed.

BRIEF DESCRIPTION OF THE DRAWINGS

The invention will be described in detail with reference to the following drawings in which like reference numerals refer to like elements wherein:

FIG. 2 is a flow diagram showing an exemplary power managing method in a related art mobile communication system;

FIG. 3 is a flow diagram showing an exemplary power managing method in a mobile communication system in accordance with a preferred embodiment of the present invention; and FIGS. 4a and 4b are flow diagrams showing an exemplary power managing method in a mobile communication system in accordance with another preferred embodiment of the present invention.

DETAILED DESCRIPTION OF THE PREFERRED EMBODIMENTS

Figure 1:
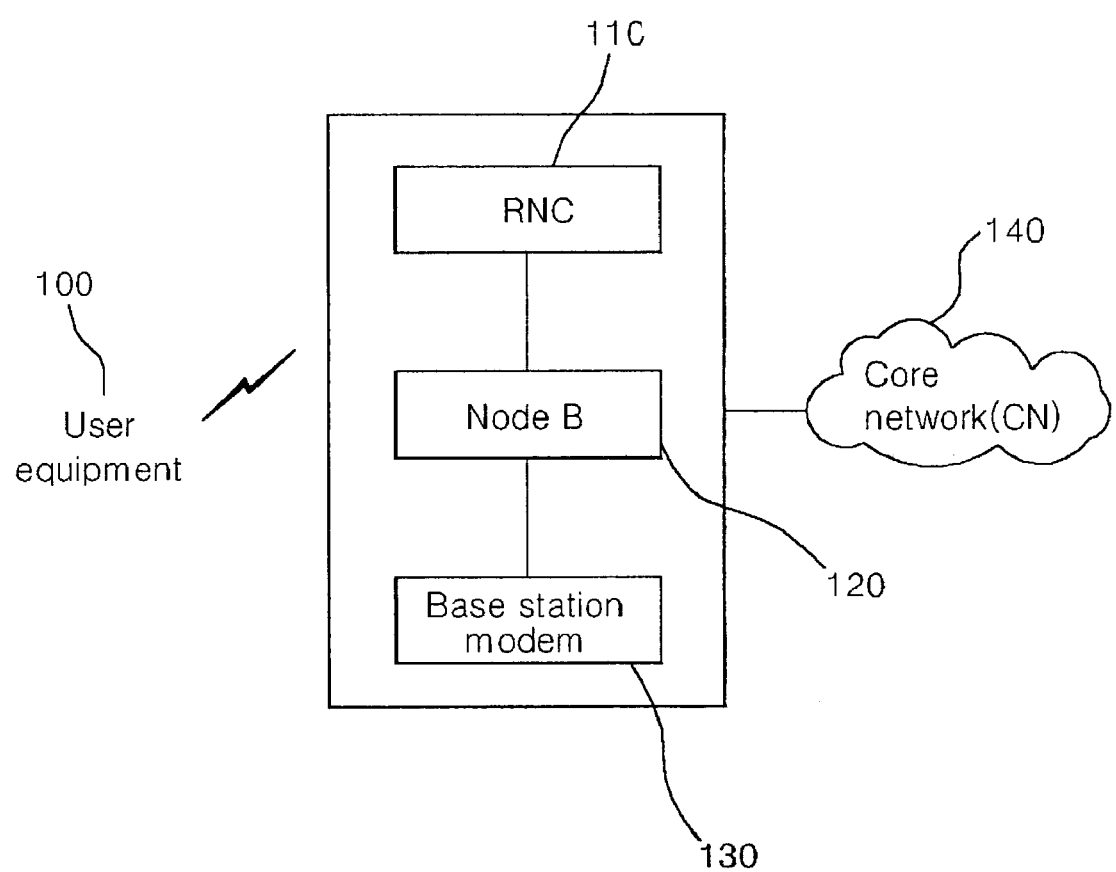
FIG. 1 is a view illustrating an asynchronous mobile communication system.

A preferred embodiment of the method and apparatus for managing power in a mobile communication system will be described in detail.

A mobile communication system according to preferred embodiments of the present invention can define minimum/maximum power values at an initial call setup and then transmit a down link power measurement request command to a base station modem via a node B. The base station modem can measure a down link power with respect to a corresponding call and determines whether or not the measured down link power value is larger than a predetermined critical value.

If the determination result shows that the measured down link power value is larger than the predetermined critical value, the base station modem preferably transmits a down link power value measurement report command to the RNC via the node B.

The RNC can control down link minimum/maximum power values in response to the down link power value measurement report command. A radio link reconfiguration command is preferably then transmitted to the base station modem via the node B. The base station modem preferably receives the radio link reconfiguration command and performs an inner loop power control according to the controlled down link minimum/maximum power values so as to manage the availability of limited resources (e.g., the down link power).

FIG. 3 is a flow diagram showing an exemplary power managing method in a mobile communication system in accordance with one preferred embodiment of the present invention. Referring to FIG. 3, a radio resource control access request command is received from user equipment, and down link initial power value and down link minimum/maximum power values are calculated. (S300) Those skilled in the art will appreciate that the preceding values are exemplary in nature and that other values and information content can be used without departing from the spirit and scope of the present invention.

A radio link setup command including the obtained down link power values (e.g., the down link initial power value, the down link minimum/maximum power values) is transmitted to the node B. (S301) The node B constitutes a radio link in response to the radio link setup command, and transmits the down link power values to the base station modem.

After step S301, an RAB (Radio Access Bearer) allocation request command is received from a core network and the down link power range is reset. Thereafter, a radio link reconfiguration is performed. (S302)

After step S302, a down link power value on the reconfigured radio link is measured. (S303) After step S303, it is determined whether or not the measured down link power value is larger than a predetermined critical value. (S304)

If the determination result shows that the measured down link power value is larger than the predetermined critical value, the down link power range is controlled and then the radio link is reconfigured in response to the controlled down link power range (S305). Steps 303, 304 and 305 are performed repeatedly for the user equipment at a calling state.

Figure 4A:
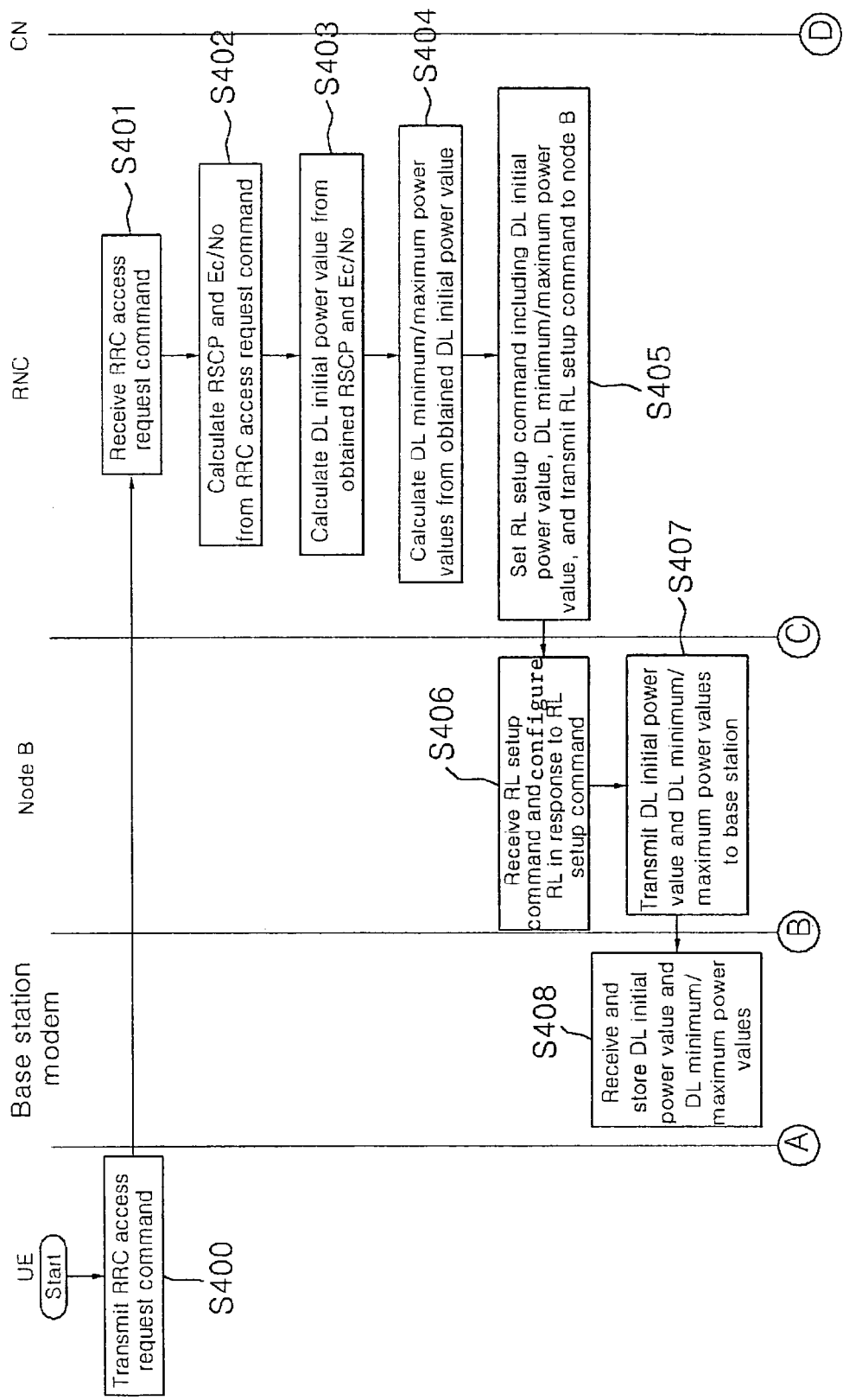

FIGS. 4a and 4b are flow diagrams showing an exemplary power managing method in a mobile communication system in accordance with another preferred embodiment of the present invention. As shown in FIGS. 4a and 4b, user equipment (UE) transmits radio resource control (RRC) access request command to RNC so as to set a signal path. (S400). The RRC access request command includes an identification number of the user equipment, request service category requested by the user, and a measurement of random access channel (RACH) information element (MORIE).

The RNC receives the RRC access request command from the user equipment, and receives an RSCP (Received Signal Code Power) value or an Ec/No (i.e., RSCP/RSSI (Received Signal Strength Indicator)) value from the MORIE contained in the RRC access request command. (S401, S402)

Here, the RRC indicates the protocol layer managing the radio resource. The MORIE (Measurement on Random Access Channel Information Element) is an information element contained in the RRC access request command transmitted from the user equipment to the RNC, and includes information such as Ec/No or RSCP measured on the RACH by the user equipment.

After the step of S402, the RNC obtains the down link initial power value from the RSCP or Ec/No value through open loop power control. (S403) The down link initial power value can be obtained using the following Equation 1.

$$\text{DOWN LINK INITIAL POWER} = \text{TARGET DPCH Ec/No} - \text{PG} - \text{CPICH Ec/No} \qquad (\text{Eq. 1})$$

In Equation 1, the PG (Program Gain) is a predetermined value (e.g., 7*30.1). In addition, the Target DPCH (Dedicated Physical Channel) Ec/No is a signal to noise ratio (Ec/No) of a channel which transmits signals and data from the base station modem to specific equipment. The CPICH (Common Pilot Channel) Ec/No is a signal to noise ratio, in which the signal is received by the user equipment.

After the step of S403, the RNC calculates down link minimum/maximum power values in consideration of and with respect to the obtained down link initial power value and the service category. (S404). The RNC sets a radio link setup command including the obtained down link initial power value, the down link maximum power value, the down link minimum power value and the like, and transmits the set radio link setup command to the node B. (S405). The node B receives the radio link setup command from the RNC, and then constitutes a radio link in response to the radio link setup command. (S406)

After the step of S406, the node B transmits to the base station modem, the down link initial power value, the down link minimum power value and the maximum power value, all of which are contained in the radio link setup command. (S407)

The base station modem receives and stores the down link initial power value, the down link maximum power value and the down link minimum power value. (S408). After the step of S408, a power level for setting a traffic path of the mobile communication system is set. A method for setting the traffic path will be described next.

A core network transmits a RAB (Radio Access Bearer) allocation request command to the RNC, so as to set the traffic adjusted minimum/maximum power values to a node B to reconfigure a radio link, and adjusting the down link minimum/maxium power values in a base station.

To further achieve at least these and other advantages in whole or in part and in accordance with the purpose of the present invention, as embodied and broadly described herein, there is provided a system including an RNC for calculating down link initial power value and down link power minimum/maxium values from a radio resource control access request command transmitted from user equipment, and resetting the down link minimum/maxium values in response to a prameter of a radio access bearer allocation request command transmitted from a core network, a node B constituting a radio link in response to a radio link setup information or a radio link reconfiguration command, which transmitted from the RNC, and a base station modem for measuring a down link power value in response to a down link power measurement request command, determining whether the measured down link power value is larger than a predetermined critical value, and storing a down link initial power value and down link minimum/maxium power values, which are determined in the RBC.

To further achieve at least these and other advantages in whole or in part and in accordance with the purpose of the present invention, as embodied and broadly described herein, path. (S409). After the step of S409, the RNC receives the RAB allocation request command, and resets the down link maximum power value and the down link minimum power value in response to a QoS (Quality of Service) parameter of the RAB allocation request command. (S410, S411) In other words, the RNC sets differently the down link maximum power value and the down link minimum power value according to a service quality. The service quality can be determined in relation to the QoS parameter or any other parameter determined to have an influence on service quality. Additionally, other parameters can be used to set power in addition to service quality (e.g. bit error rate).

After the step of S411, the RNC inserts the reset down link maximum power value and the reset down link minimum power value into a radio link reconfiguration command, and then transmits the radio link reconfiguration command to the node B. (S412)

The node B receives the radio link reconfiguration command to perform the radio link reconfiguration. (S413) If the radio link reconfiguration is completed, a radio link reconfiguration completion signal is transmitted to the RNC. (S414)

The RNC receives the radio link reconfiguration completion signal from the node B, and transmits a down link power measurement request command to the base station modem via the node B. (S415, S416) The down link power measurement request command is a signal for measuring a down link power of a corresponding call.

The base station modem receives the down link power measurement request command from the RNC and measures the down link power value. (S417) After step S417, the base station modem determines whether or not the measured down link power value is larger than a predetermined critical value. (S418)

If the determination result shows that the measured down link power value is larger than the predetermined critical value, the base station modem transmits a down link minimum/maximum power value adjustment command to the RNC. (S419)

For example, if it is assumed that the down link maximum power value and the down link minimum power value are 100 W and 10 W, respectively, and the critical value is 90% of the down link minimum power value and 90% of the down link maximum power value. As the measurement result, if the down link power value is 9.5 W, the down link minimum/maximum power value adjustment command is transmitted to the RNC since the base station modem has a link power value larger than the critical value.

The RNC receives the down link minimum/maximum power value adjustment command and adjusts the down link maximum power value and the down link minimum power value in consideration of a power level of a corresponding cell. (S420, S421)

At this point in the process, the RNC determines whether or not an available down link power exists in the corresponding cell. If the available down link power exists in the corresponding cell, the down link minimum/maximum powers are adjusted using an asynchronous radio link reconfiguration.

After the step of S421, the RNC transmits the asynchronous radio link reconfiguration command including the adjusted down link minimum/maximum power values to the node B.(S422)

After the step of S422, the node B receives the asynchronous radio link reconfiguration command and performs the radio link reconfiguration. (S423). Upon reconfiguring the radio link, the node B transmits the down link minimum/maximum power values to the base station modem. (S424) The base station modem receives and adjusts the down link minimum/maximum power values. (S425) At this point, relevant portions of the method may be repeated.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

Also, please note that the present invention has been described in an exemplary manner with the various process steps shown in an exemplary order. Those skilled in the art will appreciate that these steps can be performed in a different sequential order or in parallel, without departing from the spirit and scope of the present invention.

What is claimed is:

1. A method for managing power in a mobile communication system according to a call setup in a user equipment, the method comprising:
   a) receiving a radio resource control access request command from the user equipment and calculating a down link initial power value and a down link power range;
   b) transmitting a radio link setup command including the down link power value to a base station;
   c) setting a radio link in response to the radio link setup command, receiving a radio access bearer allocation request command to reset the down link power range, and performing a radio link reconfiguration with the base station;
   d) transmitting a down link power measurement request command to adjust the down link power range based on a down link power measurement result of a base station modem; and
   e) reconfiguring a radio link in response to the adjusted down link power range.

2. The method according to claim 1, wherein the step a) comprises:
   receiving the radio resource control access request command from the user equipment;
   obtaining a received signal code power or a signal to noise ratio from MORIE (measurement on random access channel information element) contained in the received radio resource control access request command to calculate the down link initial power value; and
   calculating the down link minimum/maximum value using the obtained down link initial power value and a service category.

3. The method according to claim 2, wherein the radio resource control access request command includes an identification number of the user equipment, a request service category requested by the user, and MORIE.

4. The method according to claim 2, wherein the down link initial power value is calculated by a signal to noise ratio of a channel transmitting data from the base station modem to the user equipment, a signal to noise ratio received from the user equipment and an operation of a processing gain.

5. The method according to claim 1, wherein the down link power range is reset in response to a QoS (Quality of Service) parameter of the radio access bearer allocation request command.

6. The method according to claim 1, wherein the step d) comprises:
   measuring a power value of the reset call and determining whether a value added to a current power is larger than a predetermined critical value;
   if the measured power value is smaller than the predetermined critical value, adjusting the down link power range in consideration of a power level for a corresponding cell, and determining whether an available down link power exists in the cell; and
   if the available down link power exists in the cell, transmitting the radio link reconfiguration command including a to-be-adjusted down link power range to a node B.

7. The method according to claim 6, further comprising reconfiguring a radio link in response to the asynchronous radio link reconfiguration command and transmitting the adjusted down link power range to the base station modem.

8. The method according to claim 1, wherein the radio resource control access request command comprises user information and communication service information.

9. The method according to claim 1, wherein the down link initial power value is calculated in accordance with data channel transmission and reception characteristics.

10. The method according to claim 1, wherein the down link power range is reset in response to a quality level.

11. The method according to claim 1, further comprising:
   f) performing the d), e) steps repeatedly for the user equipment at a calling state.

12. The method according to claim 1, wherein transmitting the down link power measurement request command includes transmitting the down link power measurement request command from a radio network controller to the base station.

13. The method according to claim 1, further comprising adjusting the down link power range based on the down link power measurement result of the base station modem.

14. The method according to claim 1, wherein receiving the radio access bearer allocation request command includes receiving the radio access bearer allocation request command from a core network.

15. A method for managing power in a mobile communication system, the method comprising:
   a) receiving a radio resource control access request command from a user equipment by a base station, obtaining a received signal code power or a signal to noise ratio from a measurement on random access channel information element (MORIE) contained in the received radio resource control access request command to calculate a down link initial power value and down link minimum/maximum power values;
   b) transmitting a radio link setup command including the down link initial power value and the down link minimum/maximum power values to a node B;
   c) receiving a radio access bearer allocation request command from the core network by the base station, resetting the down link minimum/maximum power values in response to a QoS (Quality of Service) parameter of the radio access bearer allocation request command, and performing the radio link reconfiguration;
   d) transmitting a down link power measurement request command from a radio network controller (RNC) to a base station modem via the node B;
   e) continuously measuring the down link power value in the base station modem and, if the down link power value is larger than a critical value of a down link measurement request, transmitting a down link minimum/maximum power adjustment command to the RNC via the base station;
   f) adjusting the down link minimum/maximum power values in consideration for a power level of a corresponding cell by the base station, and determining whether or not an available down link power exists in the corresponding cell; and
   g) if the available down link power exists in the corresponding cell, adjusting the down link minimum/maximum power using an asynchronous radio link reconfiguration, and transmitting the adjusted down link minimum/maximum power values to the base station modem via the node B to thereby adjust the down link minimum/maximum power values.

16. The method according to claim 15, wherein a call is allowed only when, after an operation of a determined power value of a new call and a total transmission power value of a previous down link, a result value of the operation is smaller than a critical value previously defined according to each cell.

17. The method according to claim 15, further comprising:
   h) performing the d), e), f), g) steps repeatedly for the user equipment at a calling state.

18. A method for managing power in a mobile communication system according to a traffic path setup after a call setup of a user equipment, the method comprising:
   if a radio access bearer allocation request command is received from a core network, resetting minimum/maximum power values in response to the radio access bearer allocation request command;
   measuring the reset minimum/maximum power values and determining whether the measured power value is larger than a predetermined critical value;
   if the measured power value is larger than the critical value, adjusting the minimum/maximum power values in consideration for a power level of a corresponding cell, and determining whether an available power exists in the cell; and
   if the available power exists in the cell, transmitting an asynchronous radio link reconfiguration command including the adjusted minimum/maximum power values to a node B to reconfigure a radio link, and adjusting the down link minimum/maximum power values in a base station.

19. A system, comprising:
   a radio network controller (RNC) for calculating a down link initial power value and down link power minimum/maximum values from a radio resource control access request command transmitted from user equipment, and resetting the down link minimum/maximum values in response to a parameter of a radio access bearer allocation request command transmitted from a core network;

a node B constituting a radio link in response to a radio link setup information or a radio link reconfiguration command, which are transmitted from the RNC; and a base station modem for measuring a down link power value in response to a down link power measurement request command, determining whether the measured down link power value is larger than a predetermined critical value, and storing a down link initial power value and down link minimum/maximum power values, which are determined in the RNC.

20. The system according to claim 19, wherein the RNC performs an operation of the obtained down link initial power value and total down link transmission power value and determines whether a resulting value of the operation is larger than a predetermined critical value, and a call is allowed if the resulting value is smaller than the predetermined critical value.

21. The system according to claim 20, wherein the parameter is QoS (Quality of Service).

22. A method, comprising:
a) receiving a signal to initialize a power value and establish a power range related to said received signal;
b) transmitting a setup signal including said power value to a communication node;
c) setting a communication link in response to said setup signal, receiving an allocation signal to reset said power range, and performing a communication link reconfiguration with said communication node;
d) transmitting a power measurement signal to adjust said power range based on a power measurement result of a communication node device; and
e) reconfiguring a communication link in response to the adjusted said power. range; wherein the step a) comprises: receiving the signal for the user equipment; obtaining a received signal power or a signal to noise ratio from other communication channel information to calculate an initial power value; and calculating a minimum/maximum transmission value using initial power value and a service category;
f) performing the d) and e) steps repeatedly for user equipment at a communication state.

23. The method according to claim 22, wherein transmitting the power measurement signal includes transmitting the power measurement signal from a radio network controller to a base station.

24. The method according to claim 22, further comprising adjusting the power range based on the power measurement result of the communication node device.

25. The method according to claim 22, wherein receiving the signal includes receiving an allocation signal from a core network.

* * * * *